(12) United States Patent
Scoville et al.

(10) Patent No.: US 8,582,730 B2
(45) Date of Patent: Nov. 12, 2013

(54) LIMITED CONTACT TELEPHONIC JOURNALING

(75) Inventors: Kim Scoville, Provo, UT (US); Chris A. Watt, Gilbert, AZ (US)

(73) Assignee: Kim Scoville, Provo, UT (US)

( * ) Notice: Subject to any disclaimer, the term of this patent is extended or adjusted under 35 U.S.C. 154(b) by 863 days.

(21) Appl. No.: 12/726,329

(22) Filed: Mar. 17, 2010

(65) Prior Publication Data

US 2011/0228917 A1  Sep. 22, 2011

(51) Int. Cl.
*H04M 1/64* (2006.01)

(52) U.S. Cl.
USPC .......................................... 379/88.25; 379/187

(58) Field of Classification Search
USPC .................................... 379/88.22–88.25, 187
See application file for complete search history.

(56) References Cited

U.S. PATENT DOCUMENTS

| | | | |
|---|---|---|---|
| 5,963,626 A * | 10/1999 | Nabkel | 379/142.01 |
| 6,757,366 B1 * | 6/2004 | Kaufman | 379/88.28 |
| 7,995,716 B2 * | 8/2011 | Narang et al. | 379/88.13 |
| 2007/0022169 A1 * | 1/2007 | Suzuki et al. | 709/206 |

\* cited by examiner

*Primary Examiner* — Simon Sing
(74) *Attorney, Agent, or Firm* — Chris A. Watt

(57) ABSTRACT

Systems and methods of the present invention provide for recording, accessing, responding to and archiving an audio journal stored in a dedicated voice mailbox via telephonic communication. A first user may dial a number and record a journal entry each week from a telephone or cell phone into a provided dedicated voice mailbox. A second user may access the dedicated voice mailbox where no direct phone connection with the first user is possible and respond with an appropriate reply message.

20 Claims, 2 Drawing Sheets

LIMITED CONTACT TELEPHONIC JOURNALING

The subject matter of all patent applications is commonly owned and assigned to Voiceprint LLC.

FIELD OF THE INVENTION

The present inventions generally relate to the field of telephonic communication and specifically to the field of recording, accessing, responding to and archiving a telephonic audio journal accessed on a limited schedule basis.

SUMMARY OF THE INVENTION

The present invention provides methods and systems for recording, accessing, responding to and archiving an audio journal stored in a dedicated voice mailbox via telephonic communication as well as systems and methods for recording voice messages and means for using a recording platform to facilitate indirect communication with third party participants while creating permanent interactive audio records.

An exemplary method may comprise several steps including the step of allowing a first user to dial a telephone number and record a quality journal entry each week or month from a telephone or cell phone into a provided dedicated voice mailbox. Access to the system could utilize a standard phone number, a pay-per-call phone number (such as 900 number) and toll-free number, a shortcode number, or any other dialing system now in use or hereinafter developed. The system may be configured so that no direct phone connection is possible, and careful limits may be placed on the system, so authorities over the user who set rules or guidelines regarding communication can be assured that use of the phone for this purpose will not detract from the intent of such rules or guidelines.

Interested second user intended recipients, such as family members or friends may dial an access code to listen to the recording, but never talk directly to the first user. Each message may then be digitized and compiled to an archive, such as a memorial CD. Thus, the first user may preserve their experiences and emerging observations about the experiences in their own voice and personal style of expression in a private and secure personal account, which is shared only at the invitation of the first user. The technology may be programmed to allow the second user to reply through the same system with messages of support or encouragement.

The above features and advantages of the present invention will be better understood from the following detailed description taken in conjunction with the accompanying drawings.

DETAILED DESCRIPTION

Figure 1:
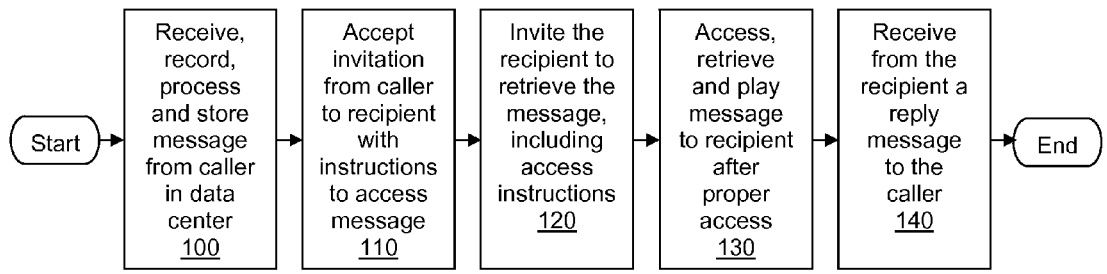
FIG. 1 is a flow diagram illustrating a possible embodiment of a method for limited contact telephonic journaling.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple phones, cell phones, computers and/or other devices connected together) arranged so that information may be passed from one part of the network to another over multiple links and through various nodes. Examples of networks include the public switched telephone network, various cellular phone networks, such as a 3G or 4G network, the global Telex network, the Internet, computer networks (e.g., an intranet, an extranet, a local-area network, or a wide-area network), wired networks, and wireless networks.

The Internet and several telephone and/or cell phone networks include a worldwide network of phones, cell phones, data centers, computers and computer networks arranged to allow the easy and robust exchange of information between computer users. Hundreds of millions of people around the world have access to these communication devices connected to such networks via service providers, such as AT&T, SPRINT, T-MOBILE, VERIZON, COX, or other communication, data or Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web. The information may also be accessed via a data center containing storage of information to be accessed via these networks. This information may be accessed via communications or data packages provided to connect the user to the appropriate network and data center.

For phone, cell phone and Internet users and businesses alike, these networks and access to the information available via stored information in a data center continues to be increasingly valuable. More people use their phones, cell phones and/or the Web for everyday tasks, from social networking, shopping, banking, and paying bills to consuming media and entertainment. E-commerce is growing, with businesses delivering more services and content across these networks, communicating and collaborating online, and inventing new ways to connect with each other.

For certain users, the ability to use a telephone to communicate directly may be restricted by time, circumstance or rules of adherence. Classes of users may include, as non-limiting examples, military personnel stationed to posts with limited phone access or who have better phone access during non-waking hours at home, and do not want to wake family by calling a live phone to get voicemail; study-abroad students or other foreign travelers with unpredictable itineraries; incarcerated persons; people in a rehabilitation organization; older generations who want to preserve their memories and life experiences; missionaries in church service; any other user whose circumstances restrict direct phone contact with intended message recipients, or who desire not to risk having to engage in a direct conversation, but prefer the advantage of a vocal rather than written message; groups of people who desire to create a voice record combining multiple voices into one common archive or any combination thereof. In each case, the phone message can act as an indirect communication, and also create a permanent voice record of the call for journaling or archiving purposes, or a written transcription.

Users who may voluntarily agree to a code of conduct prohibiting them from direct communication with family members and friends while engaged in military or church service etc. may use letters and e-mail to communicate. While this may be permissible, routine direct phone contact may distract the user such as a missionary or others from service with mundane daily matters from home. Such direct contact may therefore be limited or prohibited. The present invention may use a dedicated voice mail box which does not allow the caller or intended recipient to connect to any live person. In addition, time limitations may be placed on the caller or intended recipient, and they may only use the dedicated voice mail box at pre-established regular intervals.

Embodiments of this invention may provide an access code to allow other people to pick-up the message and listen to it indirectly, without risk of being connected to the caller. These systems and methods may allow the user to utilize telephone, cell phone and/or Voice Over Internet Protocol (VOIP) technology to more conveniently send messages without the risk of a direct phone connection which would breach the rules of adherence adopted by the user.

Methods and Systems for Recording and Accessing a Digital Message

Several different methods may be used to provide and manage the disclosed invention. In an example embodiment illustrated in FIG. 1, one or more hardware or software components on a server in a data center may be used to record a digital message (Step 100). Any combination of software modules used together with hardware on a server in a data center may receive, record, access, retrieve, present and/or accept a reply message for the digital message, possibly supplemented by additional information relating to the messages or users from data storage within the data center (Step 100). Software modules on the server may then be used to receive from a first user (i.e. a caller) the message recorded from a client. This message, along with any data relevant to the message or first user, may be stored within a data storage in the data center (Step 100). The system, including the server, client and/or data storage within the data center may be used to accept an invitation from the first user caller for a second user (i.e. one or more recipients) to access the digital message. This invitation may include one or more instructions for the second user recipient on how to access the digital message (Step 110). The second user recipient may then be invited, possibly via automated phone message, voice message, email, SMS messaging including text, mobile application or any combination thereof sent to a client for the second user recipient, and may be sent using a software module configured to send information from the data source and/or from the server in the data center to the client (Step 120). To access the appropriate message, the second user recipient may be sent a code or access feature as part of the instructions to allow the second user recipient to access the message (Step 120).

The second user recipient may then access the digital message by entering the code or access feature, which grants them access to the digital message (Step 130). The instructions for the digital message may also include a preventative feature, or intentional lack of connective feature between the first user caller and the second user recipient such that the caller is intentionally prevented from connecting with the recipient directly, and/or the recipient may only access the message through use of a code or other access feature, which in some embodiments may serve to restrict non-invited users from hearing the message. A software module configured to access the message may then be used to retrieve the message for the second user recipient (Step 130). After listening to the message, the second user recipient may be given the option to record, store and/or send a reply message to the first user caller (Step 140). The reply message may also include a feature wherein the first user and second user are not directly connected.

In addition to the functional limitations disclosed in the preceding paragraph, the preventative feature, or intentional lack of connective feature may include limits placed on the caller and/or intended recipient. In other words, the system may be designed to administer controlled limits. Thus if only certain days and times are allowed for the first user caller or second user recipient to access the phone, client, system, etc., the system may be configured accordingly so that the system may only be accessed by that user during those pre-determined times.

In one embodiment, the certain days and times allowed for the first user caller or second user recipient to access the system would be handled at the system programming level by the system administrator, who may set up types of accounts with specified limits, so the subscriber will be offered subscription options appropriate for their use. To illustrate using one of the non-limiting example described herein, when missionaries subscribe, they may be assigned to mission appropriate accounts with Monday access and 10 minute limits.

Other embodiments may exist where an administrator of the system or a user or administrator over a user may determine access on recording time and/or recording days. To illustrate using another non-limiting example described herein, a big client (such as rehab) may want access to the system to establish more customized accounts on a patient by patient basis.

Also, the system may be configured so that there is a recording time limit placed on the user of the system. The system may then also be configured so that the user of the system may only be able to access the system for that amount of time. For example, a first user caller may be able to only access the system for 5-10 minutes once a week. Likewise, the second user recipient may only be able to access the system and record for a similar amount of time, possibly 5-10 minutes a week in response to the first caller's digital message.

As a non-limiting example, a full-time missionary volunteer may report to leadership that prefers a limited amount of contact with family members or friends, in order to better focus the missionary's efforts. Although written journals and letters may be a primary way to communicate with family members, the missionary may want more vivid audio-based records of their experiences. Various non-limiting embodiments of the current invention may provide a telephone number and a data storage in the form of a dedicated voice mailbox (stored in the data storage and/or in the form of software modules on the server) to record their experiences. They may access this dedicated voice mailbox via a client machine such as a phone, cell phone or various mobile applications on a "smart phone." Access to the system could utilize a standard phone number, a pay-per-call phone number (such as 900 number) and toll-free number, a shortcode number, or any other dialing system now in use or hereinafter developed.

In this example, once the record of the experiences is in place, family members may listen to the recording, and even leave brief messages of encouragement and support in reply. An invitation may be sent to these family members with instructions on how to access the dedicated voice mail box; the time restrictions placed on access to the dedicated voice mail box; any codes or access features needed by the family members to access the digital message; whether the option to leave a reply message is available or any combination thereof.

In one non-limiting example embodiment, a subscription model may be used whereby users can pay a monthly subscription fee to make regular recording updates to a journal within the dedicated voice mail box. The user may also append information to an existing account entry, thereby creating an audio journal comprising a collection of stored digital messages. Each message and/or a collection of the messages may then be indexed, archived and/or compiled to a memorial CD for a permanent record of ongoing monthly or weekly journal experiences, and no direct phone contact may ever be made so that mission rules are never broken. This archive may also provide a valuable component for creating voice over features in the missionary's own voice for future multi-media projects created to archive mission experiences.

The system may place limits on the missionary and/or the times and days that the missionary may record digital messages to the system. If the missionary is only allowed to access the system on Mondays, a system administrator, and the system may be configured so that the missionary may only record journal entries on Mondays, and only for 5 to 10 minutes. In other embodiments, an authority over the missionary may act as an administrator to the system.

As another non-limiting example, someone in a rehabilitation organization may establish a schedule, and configure the system accordingly so that a schedule may be established in which only certain days or certain times are slotted for journaling or personal time, and phone calling may be limited to a fixed amount of minutes. In this case, a system administrator may configure the system accordingly. In other embodiments, a rehabilitation organization administrator may likewise configure the system to allow journal entries to only be limited to a certain day or time for that particular system user. Thus, larger organizations may use a system administrator working with or without an organization administrator to configure the time limitations for a system on a user by user basis.

Figure 2:
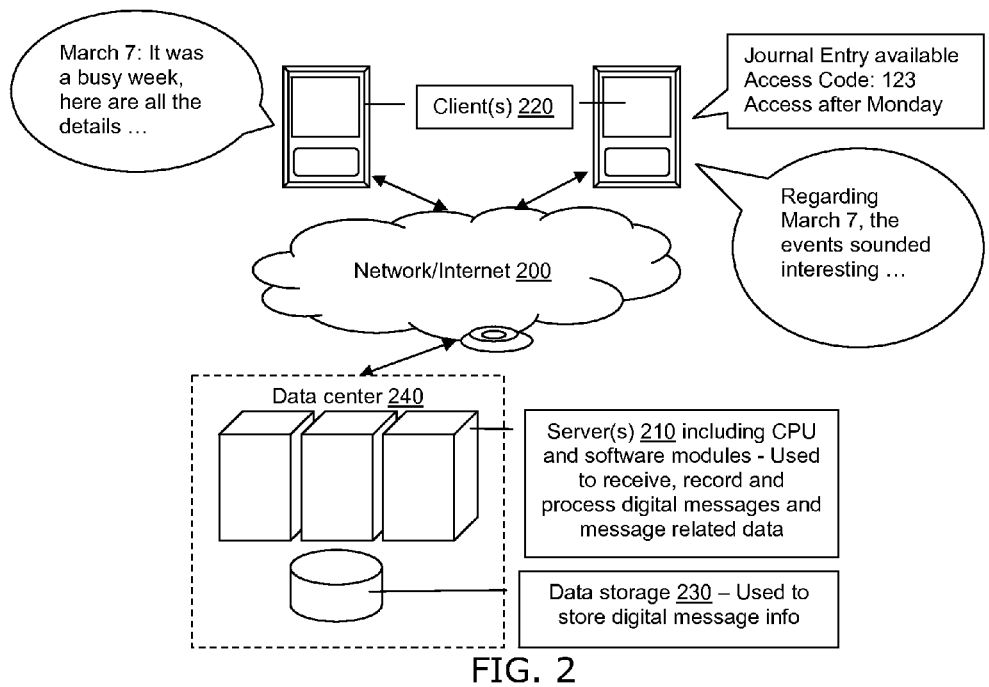
FIG. 2 illustrates a possible system for limited contact telephonic journaling.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on at least one server 210 and/or client 220 within a telephonic, cell phone or Internet network, and executing instructions stored (perhaps as scripts and/or software, possibly as software modules) in computer-readable media accessible to the CPU, such as a hard disk drive on a server 210 and/or client 220.

The example embodiments herein place no limitations on whom or what may comprise users. Thus, as non-limiting examples, users may comprise any individual, entity, business, corporation, partnership, organization, governmental entity, and/or educational institution that may have occasion record, respond to or access the archived message.

The example embodiments shown and described herein may exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with the software modules disclosed herein) may be communicatively coupled to the network 200 and to each other in such as way as to allow a user to enter into a user interface (possibly by using an interface on a cell phone to access the telephone number, or accessing speakerphone software on the cell phone to record the message), on the client 220, and for the server 210 to record the message to a dedicated voice message account for future access, response and archiving.

Such server(s) 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the Internet, user profile, and/or other data requested by a client 220.

The server 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The software modules used in the context of the current invention may be stored in the memory of—and run on—at least one server 210. As a non-limiting example of such software modules, a dedicated voice account software access module may be used to access, record to, make available to other users (possibly via an access code) and/or archive a message or journal entry to a dedicated voice account. The software modules may comprise software and/or scripts containing instructions that, when executed by a microprocessor on a server 210 or client 220, cause the microprocessor to accomplish the purpose of the module, in this example to access, record to, make available to other users and/or archive a message or journal entry to a dedicated voice account. Access to the system could utilize a standard phone number, a pay-per-call phone number (such as 900 number) and toll-free number, a shortcode number, or any other dialing system now in use or hereinafter developed.

The client 220 may be any telephone, cell phone, PDA, computer, mobile application or other program that provides services to other computers, programs, or users either in the same computer or over a telephone, cell phone and/or computer network 200. As non-limiting examples, the client 220 may include any application, communication, mail, database, proxy, fax, file, media, web, peer-to-peer, or cell phone, personal digital assistant (PDA), standalone computer, etc. which may contain an operating system, a full file system, a plurality of other necessary utilities or applications or any combination thereof on the client 220 used to access the dedicated voice account.

The client 220 that may be used to connect to the network 200 to accomplish the illustrated embodiments may include, but are not limited to a cellular phone, a wireless phone, a wireless hand held device, a hand held computer, an Internet access device, a rich client, thin client, or any other client functional with a client/server telephonic or computing architecture. Client software may be used for authenticated remote access to a dedicated voice account on a hosting computer or server. These may be, but are not limited to being accessed by a remote "smart phone" program and/or a mobile web browser, as are known in the art.

The user interface displayed on the client 220 or the server 210 may be any auditory, graphical, textual and/or scanned information a computer program presents to the user, and the control sequences such as keystrokes, movements of the computer mouse, selections with a touch screen, scanned information etc. used to control the program. Examples of such interfaces include any known or later developed combination of Voice user interfaces, Touch interfaces, Graphical User Interfaces (GUI), Web-based user interfaces, Conversational Interface Agents, Live User Interfaces (LUI), Command line interfaces, Non-command user interfaces or Object-oriented User Interfaces (OOUI). The action item generated (such as outgoing calls, account access interfaces etc.), or any other information, may be accepted using any field, widget and/or control used in such interfaces, including but not limited to a standard telephone button access keypad, a text-box, text field, button, hyper-link, list, drop-down list, check-box, radio button, data grid, icon, graphical image, embedded link, etc.

The server 210 may be communicatively coupled to data storage 230, which contains the dedicated voice account and a collection of messages, responses and/or other message-related information stored in association with the account. The data storage 230 may be any computer components, devices, and/or recording media that may retain digital data used for computing for some interval of time. The storage may be capable of retaining stored content for the telephonic journaling, any responses to the journal entries and/or any other data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data capable of storing multimedia such as a voice message journal. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, file, collection of files, spreadsheet, and/or other means of data storage such as a magnetic media, hard drive, other disk drive, volatile memory (e.g., RAM), non-volatile memory (e.g., ROM or flash), and/or any combination thereof.

In a non-limiting example embodiment, the data center 240 may provide hosting services for the dedicated voice account including, but not limited to hosting one or more computers or servers in a data center 240 as well as providing the general infrastructure necessary to offer account access and archiving services to users including hardware, software, accounts within data storage 230, servers 210 and electronic communication means necessary to connect telephonic or other clients 220 to the network 200.

Altogether, the system may comprise a voice mail system comprising the elements disclosed herein, and may be expanded to include a journal maker, audio file by email, compact disc, transcription systems, a system to provide access for invited listeners or any combination thereof.

Figure 3:
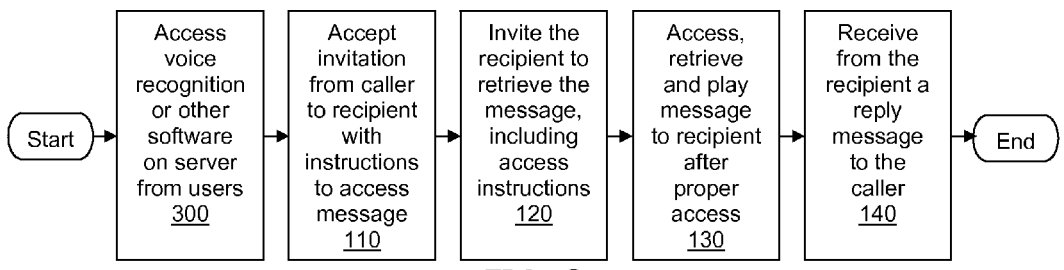
FIG. 3 is a flow diagram illustrating a possible embodiment of a method for limited contact telephonic journaling.

FIG. 3 shows that the illustrated embodiment, as well as other disclosed embodiments, may include the step of using voice recognition or other user interface software in combination with the voice messaging system (Step 300). The user interface software used in combination with the voice messaging system may be stored and executed as any combination of software modules used together with hardware on a server 210 in a data center 240. This plurality of software modules on the server 210 may be accessed by a user (first user caller, second user recipient, or any other authenticated third-party user) on the user's client 220 via an appropriate interface or voice commands (Step 300).

The use of such voice recognition or other user interface software may also allow the user to access several other features within the system to accomplish the method steps disclosed herein, possibly via one or more software modules on the server or mobile applications on the client. These options executed through the voice recognition system or any another user interface software may utilize any client and/or server technology, such as voice recognition software, mobile applications, previously disclosed user interface elements, etc. to access, record, archive, manipulate menus, etc. for the instructions from the user's client. One non-limiting example embodiment may include an option to create custom menus so that users may create a unique set of voice prompts for others to respond to.

In one non-limiting example embodiment, the user may access and be presented with (possibly via use the voice recognition or other user interface software) an option to replay the message and insert a new recording over the old message at a point selected by the user. This may be accomplished by using the one or more software modules to recognize and accept a prompt from the user at any place in the earlier-recorded message.

If the user in this example were to make a mistake in their earlier recording, the user may change from a replay mode to a recording mode using a voice or other user interface command to access the appropriate software module. The user would then not have to repeat the entire story, but could simply merge, modify and/or append the new information to the old information from the point where the original recording went wrong, and pick up the recording from that point.

One non-limiting example embodiment may include an interactive feature wherein more than one caller may access the system simultaneously to record multi-voice recordings from separate phones, similar to a conference call. Thus, additional users could also be recorded while recording the digital message. On embodiment may use this interactive feature to create more of an "interview" environment, which would allow any additional users or recipients to have access to such an interview. In addition, using the transcription features disclosed herein, such an interview could be transcribed and sent to authenticated interested third parties.

In one non-limiting example embodiment, an indexing feature may be provided to allow users to input date and/or time stamps so that specific digital files can be more easily recognized and retrieved from a group of files by the same user, where the user is recording an ongoing voice journal and not just an individual story. In another non-limiting example embodiment, options may be presented or displayed to recognize and retrieve a group of files by the same user, select a menu that suggests different topics of conversation, as well as other additional indexing features.

As a non-limiting example of such an embodiment, a voice recognition or other user interface software may be used to allow the user to receive a written transcription of the message for letter dictation or a written journal entry. Thus, the current methods and systems are not limited to audio journals, but may also be used to create written archives (via printed hardcopy or electronic files—e.g. MICROSOFT WORD or PDF file formats) of the recorded digital messages. The transcription of the digital message may then be mailed to the user in hard copy form, or emailed, texted, forwarded etc. to the user if the document is in electronic format.

Figure 4:
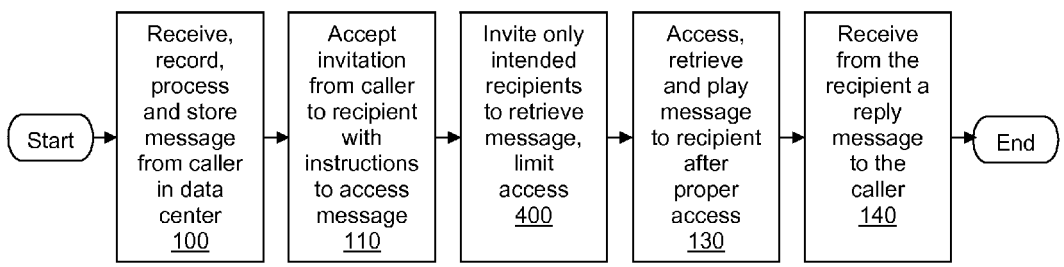
FIG. 4 is a flow diagram illustrating a possible embodiment of a method for limited contact telephonic journaling.

FIG. 4 shows that the illustrated embodiment, as well as other disclosed embodiments, may include the step of a caller (i.e. the first user) inviting only intended recipients (i.e. the second user) to retrieve a message, using a code or access feature, at an appointed time, and/or in response to an invitation or instructions (Step 400). One non-limiting example embodiment may include an option to mark a voice entry private so that it is not accessible to third party listeners.

The message and/or invitation may include a preventative feature, or intentional lack of connective feature between the first user caller and the second user recipient(s) such that the caller is intentionally prevented from connecting with the recipient directly, and the recipient can only access the message through use of the code and/or other access feature included in the instructions of the invitation. This feature may serve to restrict non-invited users from hearing the message.

The preventative feature may be accomplished via a software module executed on the server 210, based on information stored in the data storage 230. For example, the first user may be flagged within the data storage as a caller which should not be contacted by the second user directly. In addition, data may be stored in the data storage 230 relating to the days and times that such a user (i.e. a first user caller, a second user recipient or any other third party user) may access the system. Different embodiments may allow for different administrators to control this information for the day and time restrictions on the system. In one embodiment, these restrictions may be controlled by a system administrator, and offer certain options for days and times that the system may be accessed by users. In other embodiments, an administrator for the organization over the users may work with or without the system administrator to determine the days and times that the system may be available to users.

In one non-limiting example embodiment, the invitation sent to the second user may be the only possible third-party access to the message. The invitation to the second user may include a code or an appointed time that the second user may use to access the message from the first user. As a non-limiting example, the second user recipient of the message may be allowed to leave a reply message that also cannot be directly connected. As with other embodiments, this access to the second user recipient may be limited to certain days or times, as determined by a system administrator and/or an authority over possible users of the system.

This feature would overcome limitations in the art of one-way recording systems. Various embodiments of the present invention may create a more interactive environment wherein multiple callers (the first, second and or additional users) would be enabled to leave related and/or appended digital messages which may be compiled into one comprehensive audio journal.

One non-limiting example embodiment may include limits on the system that allow callers to only record messages at appropriate times according to their access opportunities or in compliance with rules of adherence, to prevent inadvertent or intentional breach of such rules. As previously described, a system administrator and/or authorities may set these limitations over the possible users.

In appending such messages, users may be presented with voice prompt features intended to inform system users that the voice message is intended to become a permanent audio record, or a public record, and messages should be appropriate for such use. The presentation of such features may be included as part of the instructions included in the invitation to the second user. Supervisory personnel may be provided access options to replay voice messages to assure proper and appropriate use of the voice messages being sent. In addition, such supervisory personnel may monitor the telephone number used to access the dedicated voice message account to prevent abuse of the system where overuse is a concern.

The additional steps included in the embodiments illustrated in FIGS. 1-4 are not limited to the embodiment shown in FIGS. 1 and 2 and may be combined in several different orders and modified within multiple other embodiments.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
 a) receiving, by a server computer communicatively coupled to a network, from a system administrator:
  i) an identification of a user for which the server computer is configured to circumvent a direct connection through the network between the user and at least one additional user; and
  ii) a limited access schedule during which the server is configured to grant the user access to a dedicated voice message account;
 b) storing, by the server computer, in a data storage communicatively coupled to the network, and in association with the dedicated voice message account:
  i) the identification of the user; and
  ii) the limited access schedule;
 c) receiving, by the at least one server computer, from the user, a request to record at least one audio journal entry;
 d) determining, by the server computer, whether the request occurs during the limited access schedule; and e) responsive to a determination that the request occurs during the limited access schedule:
   i) recording, by the server computer, the at least one audio journal entry; and
   ii) storing, by the server computer, in the data storage, the at least one audio journal entry as a permanent archive associated with the dedicated voice message account.

2. The method of claim 1, further comprising the steps of:
   f) receiving, by the server computer, from the user, an invitation content comprising at least one instruction for accessing the at least one audio journal entry during an additional limited access schedule for the at least one additional user;
   g) transmitting, by the server computer, to the at least one additional user, an invitation comprising the invitation content;
   h) receiving, by the server computer, in response to the invitation and according to the invitation content, a request by the at least one additional user to access the at least one audio journal entry;
   i) identifying and accessing, by the server computer, within the data storage, the at least one audio journal entry; and
   j) transmitting, by the server computer, the at least one audio journal entry to the at least one additional user.

3. The method of claim 2:
   i) wherein the invitation content comprises at least one additional instruction for the at least one additional user to record at least one reply message in response to the audio journal entry; and
   ii) further comprising the step of receiving and recording, by the server computer, from the at least one additional user according to the at least one additional instruction, at least one audio reply message.

4. The method of claim 1, wherein the limited access schedule comprises at least one user profile comprising a pre-established regular interval for at least one user to access the dedicated voice message account, the at least one user profile comprising:
   i) a specific day that the dedicated voice message account is accessible to the at least one user;
   ii) a specific time during the specific day that the dedicated voice message account is accessible to the at least one user; or
   iii) a fixed amount of time during the specific day for the at least one user to access the dedicated voice message account.

5. The method of claim 1, wherein the dedicated voice message account comprises:
   i) a telephone number associated with the dedicated voice message account;
   ii) a dedicated voice mailbox associated with the dedicated voice message account and configured to store the at least one audio journal entry as digital data; and
   iii) at least one software module running on the server computer and configured to:
      a) access the dedicated voice mailbox;
      b) record the at least one audio journal entry;
      c) store the at least one audio journal entry in the data storage; and
      d) transmit the at least one audio journal entry to at least one additional user.

6. The method of claim 1, wherein the permanent audio archive is created by:
   i) indexing, by the server computer, the at least one audio journal entry according to a recording date or a topic of conversation of the at least one audio journal entry;
   ii) appending, by the server computer, at least one additional audio journal entry or at least one reply message to the audio journal entry;
   iii) storing, by the server computer, the at least one additional audio journal entry or the at least one reply message as appended to the audio journal entry as the permanent audio archive; and
   iv) transferring, by the at least one server computer, the permanent audio archive onto an optical storage medium.

7. The method of claim 6, further comprising the steps of:
   i) converting, by the server computer, the permanent audio archive into a written transcription of the permanent audio archive;
   ii) generating, by the server computer, an electronic document comprising the written transcription.

8. The method of claim 6, wherein the permanent audio archive is configured to be edited by:
   i) accessing, by the server computer, the at least one audio journal entry or the at least one additional audio journal entry according to a selected date index;
   ii) receiving and recording, by the server computer, an edited recording of the at least one audio journal entry or the at least one additional audio journal entry at the selected date index; and
   iii) storing, by the server computer, the edited recording in the data storage.

9. The method of claim 1, wherein the data storage comprises:
   i) at least one user data record;
   ii) at least one user account data record;
   iii) at least one audio journal entry stored as digital data;
   iv) a database flag identifying the user for which the server computer is configured to circumvent a direct connection through the network between the user and the at least one additional user; and
   v) the limited access schedule during which the server is configured to grant the user access to a dedicated voice message account.

10. The method of claim 1, further comprising the step of receiving, from the user, at least one customization to a voice prompt menu configured to access, record or archive, by the user or at least one additional user:
    i) the audio journal entry;
    ii) the response message; or
    iii) the invitation.

11. The system of claim 1, wherein the audio journaling module is further configured to receive, from the user, at least one customization to a voice prompt menu configured to access, record or archive, by the user or at least one additional user:
    i) the audio journal entry;
    ii) the response message; or
    iii) the invitation.

12. A system, comprising an audio journaling module running on a server computer communicatively coupled to a network, the audio journaling module being configured to:
    a) receive from a system administrator:
       i) an identification of a user for which the server computer is configured to circumvent a direct connection through the network between the user and at least one additional user; and
       ii) a limited access schedule during which the server is configured to grant the user access to a dedicated voice message account;

b) store in a data storage communicatively coupled to the network, and in association with the dedicated voice message account:
   i) the identification of the user; and
   ii) the limited access schedule;
c) receive from the user, a request to record at least one audio journal entry;
d) determine whether the request occurs during the limited access schedule; and
e) responsive to a determination that the request occurs during the limited access schedule:
   i) record the at least one audio journal entry; and
   ii) store in the data storage, the at least one audio journal entry as a permanent archive associated with the dedicated voice message account.

13. The system of claim 12, wherein the audio journaling software module is further configured to:
f) receive from the user an invitation content comprising at least one instruction for accessing the at least one audio journal entry during an additional limited access schedule for the at least one additional user;
g) transmit to the at least one additional user an invitation comprising the invitation content;
h) receive, in response to the invitation and according to the invitation content, a request by the at least one additional user to access the at least one audio journal entry;
i) identify and access, within the data storage, the at least one audio journal entry; and
j) transmit the at least one audio journal entry to the at least one additional user.

14. The system of claim 13:
i) wherein the invitation content comprises at least one additional instruction for the at least one additional user to record at least one reply message in response to the audio journal entry; and
ii) wherein the audio journaling module is further configured to receive and record, from the at least one additional user according to the at least one additional instruction, at least one audio reply message.

15. The system of claim 12, wherein the limited access schedule comprises at least one user profile comprising a pre-established regular interval for at least one user to access the dedicated voice message account, the at least one user profile comprising:
   i) a specific day that the dedicated voice message account is accessible to the at least one user;
   ii) a specific time during the specific day that the dedicated voice message account is accessible to the at least one user; or
   iii) a fixed amount of time during the specific day for the at least one user to access the dedicated voice message account.

16. The system of claim 12, wherein the dedicated voice message account comprises:
   i) a telephone number associated with the dedicated voice message account;
   ii) a dedicated voice mailbox associated with the dedicated voice message account and configured to store the at least one audio journal entry as digital data; and
   iii) at least one software module running on the server computer and configured to:
      a) access the dedicated voice mailbox;
      b) record the at least one audio journal entry;
      c) store the at least one audio journal entry in the data storage; and
      d) transmit the at least one audio journal entry to at least one additional user.

17. The system of claim 12, wherein the audio journaling module is further configured to create the permanent audio archive by:
   i) indexing the at least one audio journal entry according to a recording date or a topic of conversation of the at least one audio journal entry;
   ii) appending at least one additional audio journal entry or at least one reply message to the audio journal entry;
   iii) storing the at least one additional audio journal entry or the at least one reply message as appended to the audio journal entry as the permanent audio archive; and
   iv) transferring the permanent audio archive onto an optical storage medium.

18. The system of claim 17, wherein the audio journaling module is further configured to:
   i) convert the permanent audio archive into a written transcription of the permanent audio archive;
   ii) generate an electronic document comprising the written transcription.

19. The system of claim 17, wherein the audio journaling module is configured to edit the permanent audio archive by:
   i) accessing the at least one audio journal entry or the at least one additional audio journal entry according to a selected date index;
   ii) receiving and recording an edited recording of the at least one audio journal entry or the at least one additional audio journal entry at the selected date index; and
   iii) storing the edited recording in the data storage.

20. The system of claim 12, wherein the data storage comprises a database, the database comprising:
   i) at least one data record;
   ii) at least one user account data record;
   iii) at least one audio journal entry stored as digital data;
   iv) a database flag identifying the user for which the server computer is configured to circumvent a direct connection through the network between the user and the at least one additional user; and
   v) the limited access schedule during which the server is configured to grant the user access to a dedicated voice message account.

* * * * *